Nov. 28, 1967 S. R. FOX 3,355,719

ANALOG VOLTAGE MEMORY CIRCUIT

Filed Oct. 8, 1963 2 Sheets-Sheet 1

INVENTOR.
STEPHEN RICHARD FOX

BY Howard J. Murray Jr. AGENT

George J. Rubens ATTORNEY

INVENTOR.
STEPHEN RICHARD FOX
BY Howard J. Murray, Jr. AGENT
George J. Rubens ATTORNEY

3,355,719
ANALOG VOLTAGE MEMORY CIRCUIT

Stephen Richard Fox, Los Angeles, Calif., assignor, by mesne assignments, to the United States of America as represented by the Secretary of the Navy Filed Oct. 8, 1963, Ser. No. 314,823
5 Claims. (Cl. 340—173)

The present invention relates to computers, and more particularly to an electrical network for incorporation therein which is capable of either (1) storing an analog voltage for subsequent utilization, or (2) receiving a plurality of voltage increments and developing an output representing the algebraic sum thereof.

Certain computer applications require that the information received by the computer be remembered substantially without change for an indefinite period of time. One example is found in the launching of missiles from submarines, where the various steps in orienting each missile in firing position are programmed by a computing device which must take into account a number of varying factors such as the speed of the vessel, its direction of movement, and the sea and air conditions existing at the time the operation is carried out.

Any system which is capable of satisfying the above requirements must necessarily be of at least moderate complexity. In one arrangement which has been developed, means are provided whereby a number of guidance capsules (for missiles of the Polaris type) are provided with complete launching controls by a single computing unit which incorporates as many as forty-eight energy-storage components each of which is adapted to receive varying amounts of electrical energy, the particular amount received by any one component representing a desired missile control function.

It will be recognized that in such a system the data being stored must remain essentially unchanged in magnitude regardless of the length of time that may elapse before such data is utilized. In computers where storage is effected by a series of binary memory elements the problem is not so severe, but where electrostatic components, such as capacitors, are made use of, then it is a fairly common occurrence for the charge on the capacitor to be bled off through any distributed circuit impedances, or to gradually leak off to ground. When this takes place, the output energy from the capacitor is no longer an accurate representation of the input data, and consequently quite serious errors may arise.

It is a feature of the present invention to provide means whereby an energy lost from a capacitor in the above manner is automatically replenished and thereby precluded from dropping below a predetermined level. This is brought about by operation of a servomechanism which acts to feed back a prescribed amount of energy the magnitude of which is determined by the length of time that the servomechanism's feedback is operative. This time period, in turn, is governed by the amount of energy that has been lost by the storage component in question.

One important characteristic of the present concept is that the storage device is adapted to receive input data in the form of incremental bits over a period of time. Within a range represented by each individual data bit a certain stable voltage point is established, and the servomechanism acts to maintain the stored voltage at this stable point regardless of the amount of energy that may subsequently be lost thereby, either through leakage or in the distributed circuit impedances.

In order to accomplish the above objective, it is only necessary that two regularly-recurring reference waves be available, one of such waves being a series of narrow pulses at a given repetition frequency, and the other being a preferably square wave at a frequency which is an integral multiple of the pulse frequency. The input data, on the other hand, may either be an analog voltage to be remembered, or a series of sequentially-received pulses the algebraic sum of which is desired.

One object of the present invention, therefore, is to provide an improved circuit for storing information until some subsequent time when it is to be utilized.

Another object of the invention is to provide an energy-storage network in which any received information is maintained at a constant amplitude level regardless of forces which may tend to diminish the amount of energy so stored.

A further object of the invention is to provide an energy-storage network in which means are present for automatically replenishing energy which is lost from the network between the time of its reception and the time of utilization.

Other objects, advantages, and novel features of the invention will become apparent from the following detailed description of the invention when considered in conjunction with the accompanying drawings wherein.

The essential feature of the present concept is the provision of an energy-storage device to which an analog source voltage may be applied, this voltage having a value E lying in the range between $-E_0$ and $+E_0$. The energy-storage device may take the form of a capacitor 10. Connected in parallel with capacitor 10 is a load 11 which continually bleeds the capacitor 10 of any charge which may reside thereon. In order to exactly replace the charge bled from the storage device, a voltage V is applied through an impedance 12 by the appropriate periodic closure of gates 14 and 16.

Figures 2, 3:
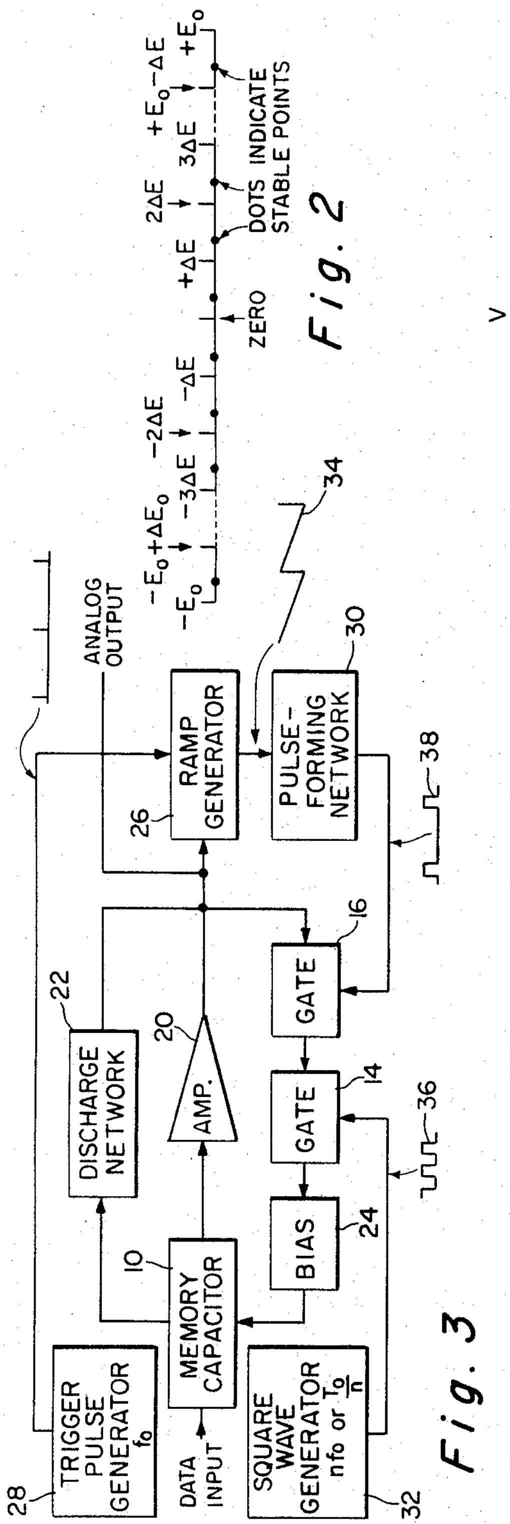
FIG. 2 is a scale indicating the stable voltage points of the servomechanism.
FIG. 3 is a block diagram of one practical circuit embodying the principles of the invention.

FIGURE 2 of the drawing illustrates the principle of operation of the disclosed system. As brought out thereby, the voltage range from $-E_0$ to $+E_0$ is divided into $n$ increments, each of which possesses one stable point indicated by a dot in the drawing. An important characteristic of the invention is that following the application of a particular analog voltage source to capacitor 10 which results in a change of the capacitor's voltage, the subsequent simultaneous closings of both gates 14 and 16 will cause the capacitor to be driven to the nearest stable voltage when the driving source voltage is removed. Throughout the following description, the "closing" of a gate is intended to mean the establishment of a path for current flow. Also, if digital information is to be recorded, the application to the capacitor 10 of any particular voltage increment whose magnitude is approximately $\Delta E$ will cause the servomechanism to drive the capacitor to that stable point *within the range of the increment*. The charge on the capacitor will be maintained at this stable point until the source voltage (digital or analog) is reapplied. If the source is analog, the capacitor 10 will again seek the potential of the source. If the source is digital, the capacitor's voltage will be changed by some increment. Upon subsequent closing of both gates and removal of the driving source the voltage of the capacitor will be brought to the nearest stable point.

Mention has been made above of the electronic servomechanism which is effective to bring the charge on the storage capacitor to the nearest stable point within a given range. A schematic showing of a preferred arrangement for achieving this objective is set forth in FIG. 3. It will be recognized that the memory capacitor may be identical to the capacitor 10 of FIG. 1, and that the gates 14 and 16 may likewise be the same in both figures. The servomechanism further includes a current amplifier 20, to which the output of the memory capacitor 10 is applied, and a discharge network 22 connected in parallel with the series combination of the memory capacitor 10 and its current amplifier 20. In parallel with the discharge network 22 is the series combination of both gates 14 and 16 as well as a bias source 24. As shown in the drawings, the modified output of the current amplifier 20 represents the output of the system. At the same time, a portion of this output is applied to a so-called "ramp" generator 26, which also receives a cyclically-carrying voltage from a source 28. The output of source 28 is in the form of a series of trigger pulses which will be described in greater detail in connection with FIG. 4 of the drawings. It is only important to note at this point that the pulses applied to the ramp generator 26 are of a regularly-recurring nature and have a frequency $f_0$. A pulse-forming network 30 receives the output of the ramp generator 26.

Referring again momentarily to FIG. 1 of the drawings, it will be recalled that the capacitor 10 only receives a charge from the voltage V when both gates 14 and 16 are closed to allow current to pass therethrough. To control the operation of these gates, a connection is made to gate 16 from the pulse-forming network 30 of FIG. 3, and in addition a wave of substantially square configuration is applied to gate 14 from a source 32.

Figures 1, 4:
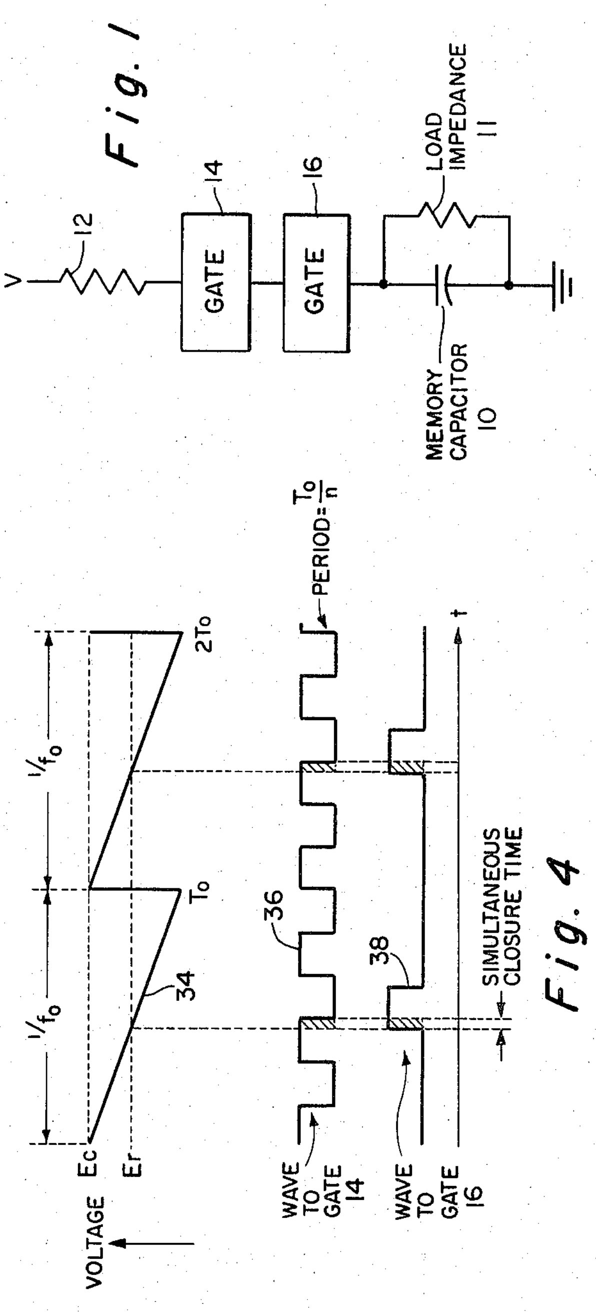
FIG. 1 is a schematic diagram of a circuit intentionally simplified in order to illustrate the principles of operation of the present invention.
FIG. 4 is a set of waveforms useful in explaining the operation of the circuit of FIG. 3.

The wave forms of FIG. 4 are believed to be helpful in understanding the operation of the servomechanism of FIG. 3. The ramp generator 26 is triggered by the pulses from generator 28 to produce a sawtooth wave 34 having a frequency $f_0$ as shown in FIG. 4, while the square wave 36 produced by source 32 has a period equal to $$\frac{T_0}{n}$$

where $n$ is a whole number. In the drawings, $n$ is arbitrarily chosen to equal 3.

The memory capacitor 10 of FIG. 1 "sees" a load impedance 11 which continually bleeds the capacitor of any charge which may be present thereon. If this capacitor is to retain or "remember" a voltage, then the net current through it must be zero, and, consequently, any charge which has been bled off through impedance 11 must be replaced. However, as shown in FIG. 1, such replenishment can only occur when *both* gates 14 and 16 are closed, at which time current can flow into the capacitor from the potential source.

The sawtooth wave 34, as illustrated in FIG. 4, has a frequency $f_0$ and a time period $T_0$. This wave 34 is initiated at the capacitor voltage level $E_c$ and, as also shown in FIG. 4, decreases beyond a predetermined reference voltage level $E_r$. The square wave 36, on the other hand, has a frequency $n.f_0$ and a time period $$\frac{T_0}{n}$$

where $n$ is an integer greater than one.

The sawtooth wave 34 constitutes the output of the ramp generator 26 of FIG. 3. This wave 34 is applied through the pulse-forming network 30 to the gate 16 as a series of rectangular pulses 30 to maintain the latter in closed circuit status for the duration of each pulse. Since current only flows into capacitor 10 when both the gates 14 and 16 are closed, and since the circuit status of gate 14 is governed by the square wave 36, a *simultaneous* occurrence of a pulse 36 and a pulse 38 is necessary for activation of the servo loop. The time interval during which current flow occurs is represented by the shaded portion of the control wave 36 (for gate 14) and of the control wave 38 (for gate 16). Expressed differently, the two gates are closed concurrently *only* during the shaded time interval in FIG. 4.

The operation of the circuit of FIG. 3 as a servomechanism will be clear if it is assumed (for example) that the time period during which both gates 14 and 16 are concurrently closed is too short, and that all of the charge bled off the memory capacitor 10 is not replaced. Under such circumstances, there is a net current flow out of the capacitor, and its voltage $E_c$ must decrease. Since $E_c$ is of reduced value, the sawtooth wave 34 produced by the ramp generator 26 must start from a lower voltage level (see FIG. 4) and hence less time will elapse before this wave 34 reaches the reference voltage level $E_r$. Since the time instant at which the wave 34 reaches this threshold level $E_r$ determines the point at which gate 16 closes (or in other words the rising edge of a control pulse 38 in FIG. 4) then the period during which *both* gates 14 and 16 are closed is lengthened, since the repetition frequency of wave 36 is constant and its period remains unchanged. With the time of simultaneous gate closing being thus lengthened, more current flows into the memory capacitor from the potential source 24 to compensate for that bled off through the distributed circuit impedances. After a number of cycles of operation of the servomechanism in the manner above described, the voltage on the memory capacitor stabilizes itself so that gate 16 closes at a time such that the current cyclically pulsed into the memory capacitor *exactly* counteracts the current bled off through the circuit impedances, and the network reaches a state of equilibrium at one of the points depicted by the black dots in FIG. 2 of the drawings.

The above discussion has demonstrated the phase-lock nature of the servo loop which includes the ramp generator 26 and the pulse-forming network 30. It should be noted, however, that the square wave 36 which is applied to gate 14 to control the circuit status thereof has a frequency higher than the frequency of the sawtooth wave 34 produced by the ramp generator 26, and hence of the pulses 38. In the example chosen, the frequency of the pulses 36 is three times that of the pulses 38. Since gate 14 is cyclically closed three times for every time that gate 16 is closed by the application thereto of the pulses 38, there will be three stable voltages at which the memory capacitor 10 can remain. The precise voltage remembered thereby depends on whether lock-on is achieved on the first, second or third opening of gate 14, or, in other words, on whether lock-on results during the first, second or third cycle of the square wave 36. Consequently, the servo loop has a theoretical upper limit of accuracy equal to $$\frac{100}{n}\%$$

where $n$ equals the frequency of the wave 36 divided by the frequency of the sawtooth wave 34.

It will now be recognized that, since $n$ discrete voltages can be stored by the memory capacitor 10, the circuit illustrated in FIG. 3 can operate either as a digital-to-analog converter or as a device for accumulating a series of voltage increments the sum of which represents a desired output. For example, if the device is storing a voltage such that lock-on is effective on the $i^{th}$ period of gate 14, then a predetermined quantity of charge can be pulsed into the memory capacitor 10 such that lock-on is achieved in the $(i+1)^{st}$ period of gate 14. Thus the voltage on the memory capacitor is stepped up and served to the next stable voltage that it permanently remembers (indicated by the black dots on FIG. 2) until another pulse of current drives the capacitor either (*a*) back down so that lock-on again occurs on the $i^{th}$ interval, or (*b*) further up so that lock-on is effected on the $(i+2)^{nd}$ interval. Hence, both data accumulation and digital-to-analog conversion is accomplished.

Figure 5:
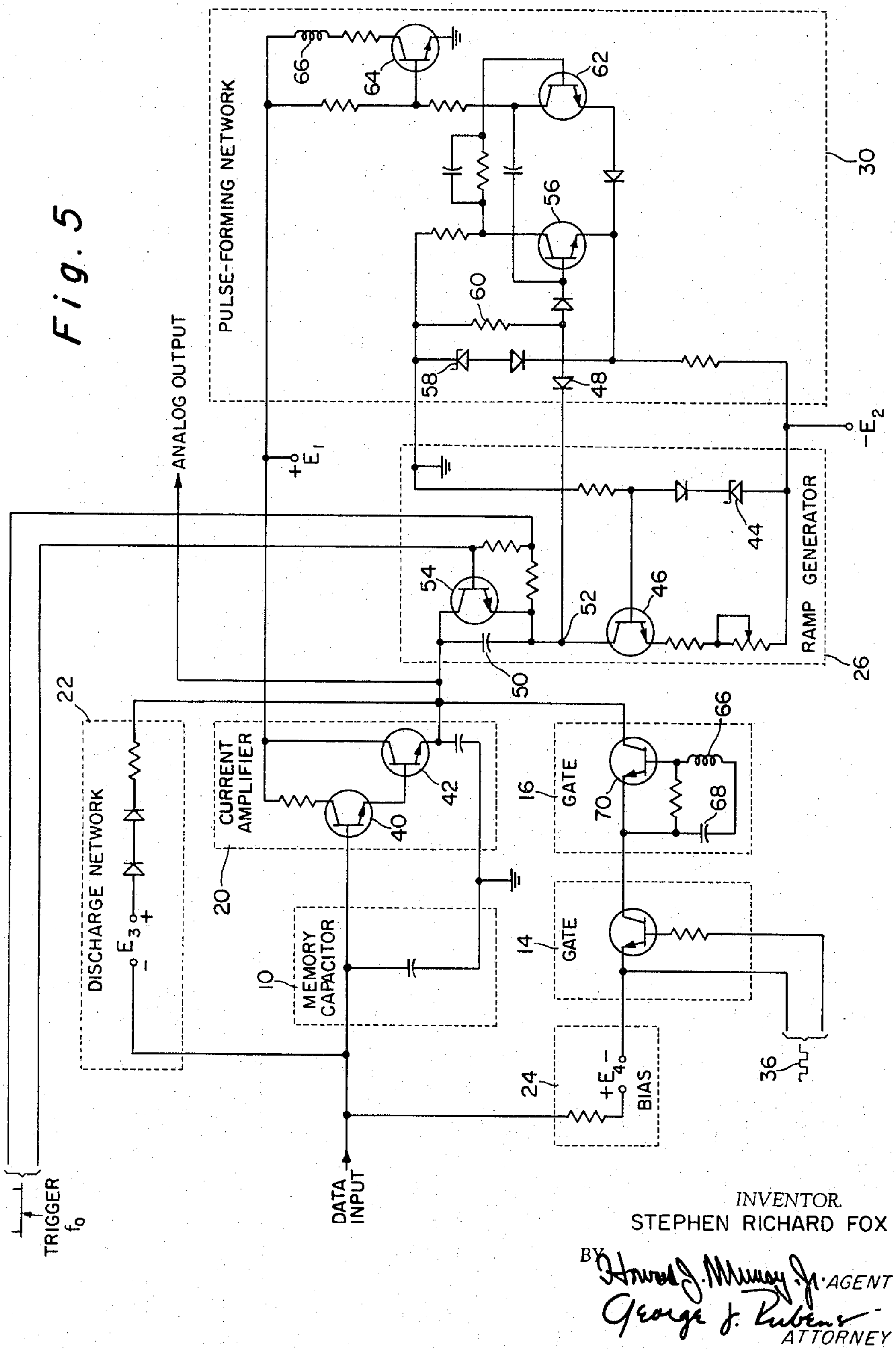
FIG. 5 is a circuit diagram setting forth the details of each of the individual networks included in FIG. 3.

In FIG. 5 of the drawings is illustrated certain of the operating details of the system of FIG. 3. For example, the memory capacitor 10 is shown as feeding into a high-gain current amplifier 20 which is designed to minimize loading. The output of this amplifier is at essentially the same level as the voltage on capacitor 10, and is applied to the ramp generator 26. The latter is triggered at a rate $f_0$ by pulses from generator 28 (FIG. 3). When the ramp generator output (the sawtooth wave 34) reaches the reference voltage level $E_r$ (FIG. 4) the network 30 produces a pulse 38 which acts to close the gate 16. At the same time, gate 14 is being sequencially opened and closed by the square wave 36 from generator 32.

Considering now certain of the circuit details, it will be seen that the current amplifier 20 consists of two cascaded emitter follower transistors 40 and 42. The voltage at the emitter of transistor 42 has a value two diode drops below the voltage on capacitor 10, and, consequently, is not exactly equal to the capacitor voltage $E_c$. In the ramp generator 26, a Zener diode 44 impresses a constant voltage across the resistors between the emitter of a transistor 46 and $-E_2$, making the collector of transistor 46 act as a constant-current sink. If a diode 48 in the pulse-forming network 30 is back-biased, this current flow through transistor 46 also flows through a capacitor 50 and, since the emitter of transistor 42 is held at two diode drops below $E_c$, the voltage at point 52 decreases linearly with time. By applying a pulse of frequency $f_0$ to turn on transistor 54 and discharge capacitor 50, the negative-going sawtooth at point 52 is made to start from two diode drops below $E_c$.

Referring again to the pulse-forming network 30, the emitter of transistor 56 is held at a negative potential (minus 7 volts, for example) by the Zener diode 58. If the voltage point 52 is much more positive than the emitter voltage of transistor 56, then diode 48 is back-biased, and the resistor 60 biases transistor 56 on. When transistor 56 is conducting, transistor 62 is cut off, and transistor 64 is on. As the sawtooth voltage at point 52 decreases, diode 48 will start to conduct. This withdraws the bias that transistor 56 received from resistor 60. At this point, regeneration between transistors 56 and 62 quickly turns the former off, the latter on, and transistor 64 off. When transistor 64 goes off, the two inductively-coupled coils 66 (one being part of the gate 16) will "ring" through capacitor 68 and the base-emitter diode portion of transistor 70, turning the latter on and closing gate 16.

It will be recalled that gate 14 is opened and closed at the rate of $n.f_0$ c.p.s. and, when both gates 14 and 16 are closed, current flows into the capacitor 10 due to the bias established by source $E_4$ in the unit 24. In a representative circuit, typical values for $f_0$ and $n$ are 1600 and 612, respectively. In the example given, $n.f_0$ has a value of 979.2 kc.

The discharge network 22 is designed so that a known quantity of current is bled from the memory capacitor 10. The circuit of FIGS. 3 and 5 functions such that $$\int I_{\text{capacitor}}\, dt = \int_0^{T_0} I_{\text{bleed}}\, dt + \int_0^{t} I_{\text{replenish}}\, dt = 0$$

where $T_0$ is the period of the sawtoother wave 34 (FIG. 4) and $t$ is the time during which both gates 14 and 16 are closed. Consequently, the better $I_{\text{bleed}}$ is controlled, the easier it is to design the replenishing network.

It should be noted that both the discharge network 22 and the replenishing circuit "float" with the memory voltage, so that both $I_{\text{bleed}}$ and $I_{\text{replenish}}$ are not extensively dependent on the remembered voltage.

The data input to capacitor 10 may comprise either (1) an analog voltage the magnitude of which is to be remembered, or (2) a digital source to "dump" current pulses into the capacitor for accumulation and digital-to-analog conversion.

Obviously many modifications and variations of the present invention are possible in the light of the above teachings. It is therefore to be understood that within the scope of the appended claims the invention may be practiced otherwise than as specifically described.

I claim:

1. In a computing system wherein electrical energy representing data to be remembered is retained by a storage device under conditions where such energy is subject to gradual diminution over a period of time, such loss of energy resulting in the output data from the system no longer being an accurate representation of the data originally received thereby, the combination of:

- a source of data to be remembered;
- an energy-storage device receiving data from said source;
- a second source of energy to be supplied to said storage device to replenish energy gradually lost therefrom over a period of time;
- means for controlling the amount of energy supplied to said storage device from said second energy source, said controlling means including first and second gates connected in series relation;
- means for selectively controlling the operation of said first and second gates so that, when both gates are concurrently activated to establish a current path therethrough, energy is supplied from said second source to said storage device to replenish energy which may have been gradually lost therefrom subsequent to the reception thereby of data from said source; and
- means for regulating the operation of said last-mentioned means so that the time period when both said gates are concurrently activated to establish a current path therethrough is a function of the amount of energy present in said storage device.

2. A system for maintaining the amount of energy in a memory capacitor at a level which is representative of data previously received by said capacitor, said system including:

- a memory capacitor adapted to receive data energy;
- an external source of replenishment energy for said capacitor;
- a circuit for controlling the flow of replenishment energy into said capacitor to compensate for that lost thereby subsequent to the reception of said data, said circuit including
- a first source of gating pulses of a predetermined constant repetition frequency;
- a first gate closed upon the reception thereby of a pulse from said first source;
- means for generating a cyclically-recurring control wave the amplitude of which is a function of the amount of data energy in said capacitor at any given instant of time;
- a second source of gating pulses the time of occurrence of which is governed by the instantaneous amplitude of said control potential;
- a second gate closed upon the reception thereby of a pulse from said second source; and
- means for connecting said two gates in series with said external source of replenishment energy so that, upon the concurrent closing of both said gates following the reception by each gate of a pulse from its respective source, replenishment energy will flow into said capacitor to compensate for that lost subsequent to the reception of said data.

3. The combination of claim 2 in which said cyclically-recurring control wave is of substantially sawtooth configuration.

4. A system according to claim 2, in which said circuit for controlling the amount of replenishment energy which flows into said capacitor to compensate for that lost thereby subsequent to the reception of said data includes a generator developing an output wave of sawtooth configuration, the instant of generation of each cycle of said sawtooth wave being determined by the level of the energy present in said memory device at such time, and means for developing an output pulse during each cycle whenever said sawtooth wave reaches a predetermined energy level, the pulses so developed being applied to said second gate to control the circuit status thereof.

5. In a computer incorporating an energy-storage device of the capacitance type which is adapted to receive energy representative of data to be remembered, and which energy is subject to gradual diminution over a period of time subsequent to its reception by said device so that after such period of time said energy is no longer representative of the data supplied thereto, the improvement which comprises a circuit for maintaining a predetermined energy level on said capacitor which is determined by the magnitude of the stored energy at any given instant of time, said circuit comprising:

a capacitor adapted to receive energy representative of data to be remembered;

a current amplifier in series with said capacitor and to which the output of said capacitor is applied;

a first gate;

a second gate;

a source of replenishment energy for said capacitor;

means for electrically connecting said two gates and said source of replenishment energy in series with one another, the resulting series combination being connected to said capacitor and in parallel with said current amplifier;

a discharge network connected in parallel with the series combination of said two gates and said source of replenishment energy, said discharge network acting to diminish the charge on said capacitor at an essentially constant rate;

a sawtooth wave generator receiving the output of said current amplifier;

means for triggering said sawtooth wave generator at a predetermined frequency;

a pulse generator connected to said sawtooth wave generator and acting to produce a pulse whenever the amplitude of said sawtooth wave reaches a predetermined reference level;

means for applying the output of said pulse generator to control the operation of said second gate;

a source of square-wave voltage of a constant frequency higher than that at which said sawtooth wave generator is triggered; and means for applying a square wave voltage from said source to control the operation of said first gate;

whereby, when both said gates are concurrently closed, current will flow into said capacitor from said source of replenishment energy to compensate for a diminution thereof and a restoration of such energy to a level where it will be representative of the data to be remembered.

References Cited

UNITED STATES PATENTS

| | | | |
|---|---|---|---|
| 3,014,169 | 12/1961 | MacIntyre | 320—1 |
| 3,050,673 | 8/1962 | Widmer | 320—1 |
| 3,171,986 | 3/1965 | Bonner et al. | 307—109 |

BERNARD KONICK, *Primary Examiner.*

J. F. BREIMAYER, *Assistant Examiner.*